United States Patent [19]

Schrepfer

[11] Patent Number: 4,572,471
[45] Date of Patent: Feb. 25, 1986

[54] SPRING-EQUIPPED MECHANICAL VIBRATION DAMPER

[75] Inventor: Rudolf Schrepfer, Küsnacht, Switzerland

[73] Assignee: Rudolph Schrepfer AG, Kusnacht-ZH, Switzerland

[21] Appl. No.: 592,516

[22] Filed: Mar. 23, 1984

[30] Foreign Application Priority Data

Aug. 31, 1983 [CH] Switzerland ............... 4784/83

[51] Int. Cl.⁴ .............................................. F16F 7/00
[52] U.S. Cl. ................................... 248/560; 248/618; 248/638; 267/158; 267/163
[58] Field of Search ............... 248/560, 618, 619, 591, 248/638, 637, 603, 605, 636; 267/158, 160, 163, 47, 48

[56] References Cited

U.S. PATENT DOCUMENTS

| 153,594 | 7/1874 | Miller | 248/618 |
| 2,580,815 | 1/1952 | Mooney | 248/618 |
| 2,901,703 | 8/1959 | Plunkett | 267/160 |
| 3,080,160 | 5/1963 | Orner | 267/160 |
| 3,417,984 | 12/1968 | Sundlinger | 267/160 |
| 4,269,400 | 5/1981 | Jensen | 267/163 |

FOREIGN PATENT DOCUMENTS 707778  7/1941  Fed. Rep. of Germany ...... 248/560

Primary Examiner—Reinaldo P. Machado
Assistant Examiner—Alvin Chin-Shue
Attorney, Agent, or Firm—Charles E. Pfund

[57] ABSTRACT

Upon a spider with rigid arms (4) and thereon adjoining mounting plates (1) are placed spring bands (81,82,83). These are supported on battens (12) on the mounting plates (1) and connected via screw bolts (20). By means of the screw bolts (20) the spring tension of the leaf spring strips (71,72,73) can be varied. Upon this triangle of strips rests another spider, containing rigid arms (5) and mounting plates (2). The contact site of the leaf spring sections (71,72,73) on the battens (12) is linear and in the same way there exists a linear resting of the arms (5) on the underlying strips. The mounting plates (2) of the upper spider contain again battens (12) and clamp bolts (20) forming a linear support. The superposed spiders are guided against one another through sleeves (9), guide rod (10) and key (11). Because of the fact that there exist leaf spring sections, the mounting height of the vibration dampers is very small. By means of the screw bolts (20) the spring tension can be changed in a very simple manner. The vibration damper is intended as vibration insulator for mechanical vibrations of very low frequencies.

9 Claims, 7 Drawing Figures

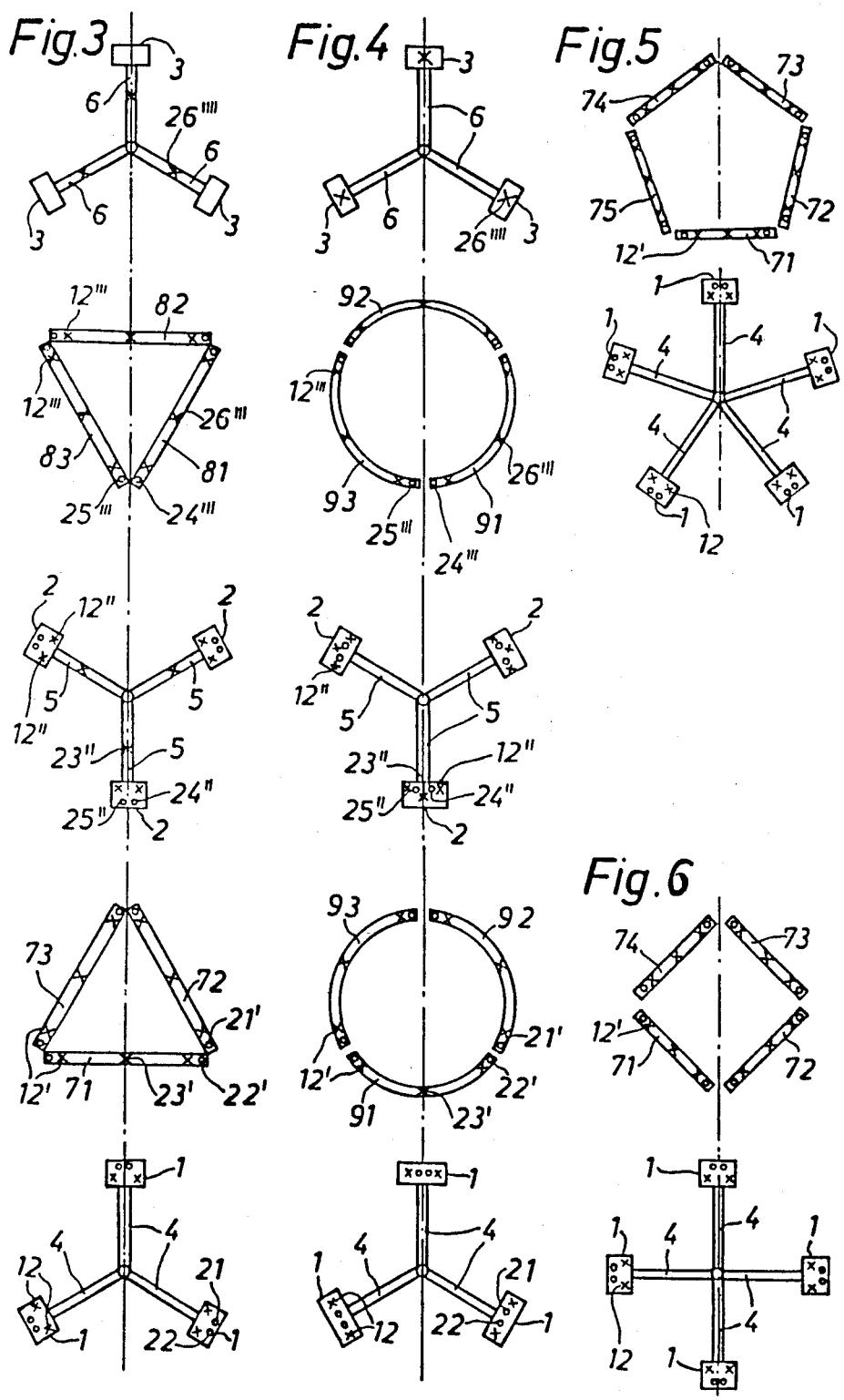

SPRING-EQUIPPED MECHANICAL VIBRATION DAMPER

This invention relates to structural supports providing vibration damping

BACKGROUND

Vibrations damper are known which provide vibration insulation and for damping of very low-frequency mechanical oscillations. As is well known, apparatus, machines or whole industrial plants whose disturbance frequency lies around 10 Hz or lower can efficiently be insulated only in exceptional cases, and then only with very large expense. Such installations are, for example, the so-called "silent blocks", which basically consist of a rubber-like elastic material.

The effectiveness of a vibration insulation has, as is well known, a direct connection with the inherent frequency of the insulator, that is, of the vibration damper and this inherent frequency in turn should lie, if possible, below the disturbance frequency. There exists thus the need for a vibration damper of low inherent frequency and simultaneously of maximal stability transverse to the damping direction, which damper requires at the same time little space and whose adjustability is yet at all times ensured in a simple manner

SUMMARY OF THE INVENTION

The vibration damper of the disclosed embodiments are characterized by alternately parallel superposed arranged rigid spiders and leaf spring sets, which spiders display in the center in each instance a guide bushing which is penetrated by a bar or key rod running perpendicular to the spiders, guiding it reciprocally, and securing it against a relative rotation, and whereby the spiders have arms and where at their outer ends are arranged mounting plates with supports and at least one connector for the leaf spring sets, which leaf spring sets are composed in each case of leaf spring sections and where each leaf spring section rests on both of its end regions in line contact upon one of the supports, and is connected on the section which overhangs at the site of support through one of the connectors with the mounting plate of the respective underlying rigid spider. The spiders in turn rest in line contact upon a point equally distant from both supporting sites upon a respective leaf spring section of an underlying leaf spring set, whereby the mounting plate of the lowest-lying spider is designed for resting upon one respective foundation.

The supports arranged at the mounting plates preferably are designed a battens which extend perpendicular to the center lines of the leaf spring sections resting upon them and the clamping elements can be screw bolts screwed into the mounting plates of the overhanging sections of the leaf spring sections. From this there result line rests running at right angles to the spring length, and thereby a maximal utilization of the elastic properties of the respective cushioning elements. The connectors can be e.g. screw bolts screwed into the mounting plates which penetrate the sections of the leaf spring sections that overhang at the battens. There can thus be obtained a controllable initial stressing of the leaf spring sections and with this a uniform pressure distribution even on non-centric center of gravity of the body that carries out the vibrations, e.g. a machine.

Some of the illustrated leaf spring sets contain linearly proceeding leaf spring strips, and additional leaf spring sections shown in the embodiments are constructed in the shape of a bow. While the linearly proceeding leaf spring sections bend in known manner under a load it has to be noted that the illustrated curvilinear sections not only bend under load but additionally twist. There can thus arise under load a rotary bending distortion.

DESCRIPTION OF THE DRAWINGS

The subject matter of the invention is explained by way of example in more detail with the aid of the drawings.

FIG. 3 is an exploded view of the vibration damper of FIG. 1 constructed according to the invention, FIG. 4 is an illustration similar to that of FIG. 3 of a vibration damper with modified spring sections of circular segment shape, FIGS. 5 and 6 are illustrations similar to those of FIG. 3 showing additional alternative embodiments of the vibration damper of the invention.

In FIG. 1 is illustrated a top plan view of a vibration damper having different structural layers or planes. This vibration damper is intended, for example, to support a machine on the floor of a workshop. The lowest structural plane is formed by a rigid spider consisting of three arms 4. In the center of the spider these arms 4 are rigidly connected with a guide bushing 9. At their outermost, i.e. distal ends each arm 4 is rigidly connected with a mounting plate 1. Through these three mounting plates 1 the vibration damper is supported on the floor. The mounting plates 1 may hereby additionally be provided with skid protection damping pads 13. On different embodiments these mounting plates 1 can be equipped with "AIR-LOC" (trademark) skid protection plates and damping pads 13 which are known in the technical world and thus require no detailed description. The mounting plates 1 can be set as such on any foundation or anchored into the floor.

Figure 1:
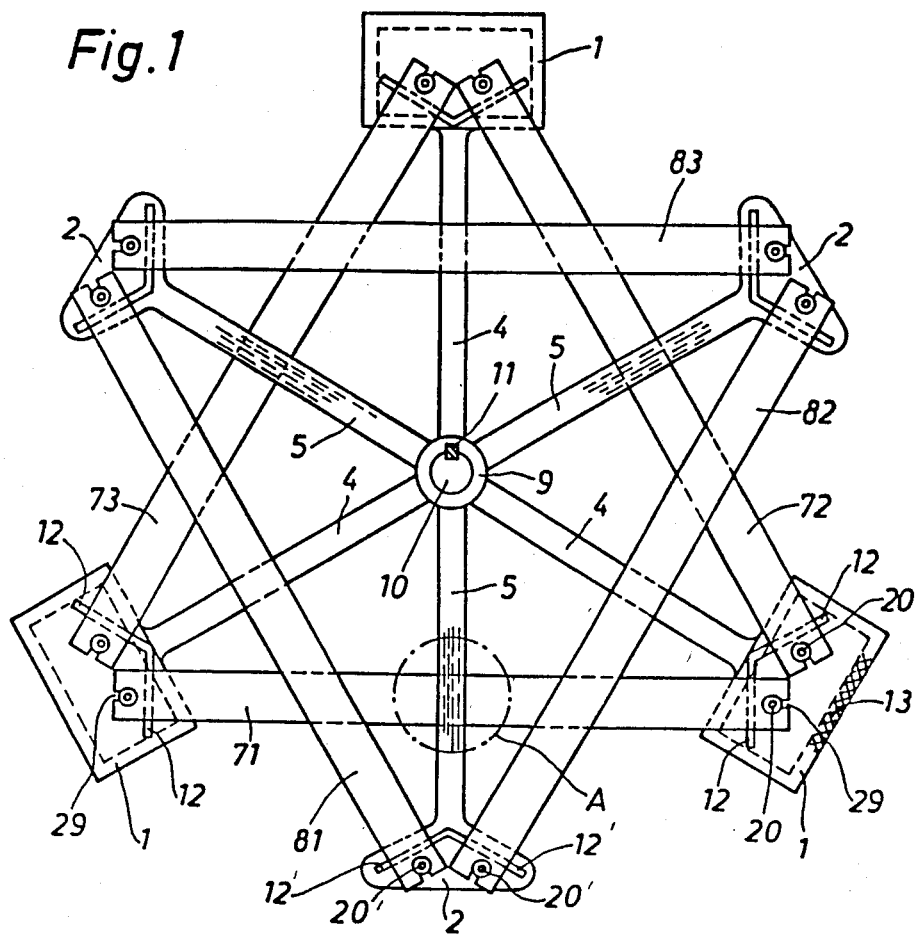
FIG 1. is a top plan view of a first embodiment of a vibration damper of the invention.

On each mounting plate 1 are arranged two battens 12. The mounting plates 1 are further equipped with connectors, in this case screw bolts 20 or other fasteners may be used as connectors. The connector can also be formed by an undetachable connection, e.g. a welding location. These structural members form now the lowest tier of the vibration damper.

The second layer is formed by three rectilinearly extending leaf springs 71, 72 and 73. These leaf springs 71, 72 and 73 arranged in the form of an equilateral triangle lie at their end regions in each case upon a batten 12 of the underlying mounting plate 1. In the sections of the leaf springs overhanging at the battens 12 there are constructed end slots 29. The screw bolts 20 penetrate these slots 29. With this each leaf spring section is clamped onto the mounting plate 1. It is now obvious that the spring tension can be changed through these screw bolts 20 so that the initial stress is in springs 71, 72 and 73 selectable within limits. The battens 12 extend perpendicular to the leaf spring sections 71, 72 and 73 so that a maximal utilization of their elastic properties is ensured.

The third layer of the vibration damper is again formed by a spider having rigid arms 5. In the center of the spider the arms 5 are again firmly connected with a guide bushing 9' which is separated from the underlying guide bushing 9. The outermost ends of the arms 5 are equipped with mounting plates 2. These mounting plates 2 again have battens 12' and screw bolts 20'. The arms 5 rest on the underlying leaf spring sections 71, 72 and 73 as shown in FIG. 2 which illustrates the detail A of FIG. 1 in enlarged scale. In FIG. 2 is illustrated a position of the leaf spring section 71 and of the superposed arm 5 of the upper spider. The arm 5 has a wedge-shaped cross section with rounded-off crown (apex) area. Through this there results also here a linear supporting site of the arm 5 on the leaf spring section 71. The upper spider with the arms 5 is arranged rotated relative to the lower spider with the arms 4 by an angle that is one half the angle distance between the respective arms. With this, the arms 5 lie exactly on the center of the underlying leaf spring sections 71, 72, 73.

The fourth layer is formed by the leaf spring sections 81, 82, 83 arranged in an equilateral triangle. As evident from the lower part of FIG. 1 these leaf spring sections 81,82,83 rest on their ends upon the perpendicularly extending battens 12 of the mounting plates 2 and are connected with them by means of screw bolts 20'.

To prevent a relative rotation of the superposed-tiered spiders their bushings 9 and 9' receive a rod 10 which is locked relative to rotation in each case with the guide bushings 9 and 9 by means of a key 11.

Figure 2:
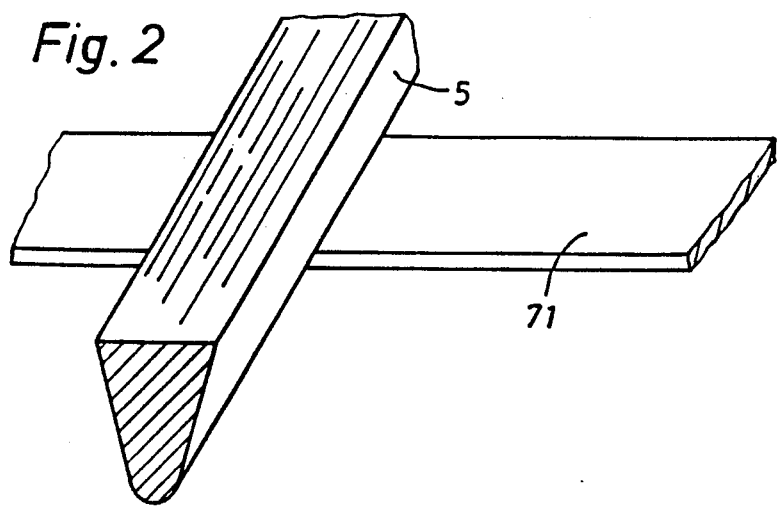
FIG. 2 is a fragmentary detail view of the region A of FIG. 1.

Depending on the intended application it is possible to stack optionally additional spiders, and triangularly arranged leaf spring sets alternately above one another as described and shown in FIG. 1.

Reference is now made to FIG. 3. Here is shown for more detailed explanation a vibration damper designed similar to FIG. 1 in an exploded view. Several details, such as for example the rod 10 are not depicted in this figure. The battens 12 are schematized.

In the individual drawings of FIG. 3 and also FIGS. 4, 5 and 6 those connecting sites where a firm connection is produced by means of a screw bolt are indicated by a small circle and supporting sites, inclusive of those at the battens 12, are indicated with an X. Let it be assumed that the spider with arms 4 which is shown in the drawing of FIG. 3 as lying lowest is intended to rest on the bottom of an enginehouse. The drawing shows its three arms 4 and the mounting plates 1 with the battens 12 which secure the line contact of the springs. On this spider the leaf spring sections 71, 72, 73 are present as second layer. For example the leaf spring section 72 is connected at the site 21' by means of the screw bolt with the site 21 of the mounting plate 1, and the leaf spring section 71 is connected for example at the site 22' with the screw bolt at the site 22 with the mounting plate 1. The triangle of leaf spring sections lies thus at its sites 12' supported by a line contact at the battens 12 upon the spider and is connected with it at the respective outer sites. Above this triangle of leaf spring sections is now arranged another spider. This has three arms 5 and the mounting plates 2. This spider rests now upon the just described triangle of leaf spring sections. The supporting sites 23' are denoted with X. Correspondingly the arm 5 rests as shown for example in the drawing as proceeding perpendicularly, at the site 23" upon the site 23' of the leaf spring section 71. The supporting site 23' of the leaf spring section 71 is equidistantly removed from the left and right lying screw connecting sites 22'. Upon this second spider which, as is shown, is turned by an angle relative to the lowest spider, which angle is one-half the angle distance of the arms 4 or 5, respectively, rests another leaf spring set containing the leaf spring sections 81, 82 and 83. While the earlier described leaf spring sections 71, 72, 73 describe a triangle with the vertex lying above, now this top triangle 81, 82, 83 stands on its vertex. The leaf spring sections 81, 82 and 83 of this triangle are bolted for example at 24''' to the site 24" of the mounting plate 2 or at 25''' with the site 25" of the plate 2. Furthermore the leaf spring sections rest at their sites 12''' upon the battens 12".

Upon this leaf spring set there rests now the uppermost spider having three arms 6 and mounting plates 3. The supporting site of this spider upon the underlying leaf spring sections is denoted for example with 26'''' and the supporting site on the corresponding underlying leaf spring section 81 with 26'''. This uppermost spider now directly carries the machine to be supported. For this purpose the mounting plates, 3 can form for example the junction with the frame of the machine. According to an advantageous embodiment there is however arranged at the uppermost spider a levelling element (and likewise guided through the centering rod 10). This leveling element may consist for example of a ball and cup. There exists thus on the described vibration damper below, on the one hand, a three-point support contact so that an automatic adaption to the base is present, and above exists a swivel connection with the machine frame that is to be supported so that the vibration damper compensates for any variations in position between machine frame and floor.

In FIG. 4 is shown another exemplified embodiment. The lower spider again is formed by three rigid arms 4 with the mounting plates 1. The battens are denoted with 12. The superposed leaf spring set is round and is composed, in particular, of three circular segment-shaped leaf spring sections 1, 92 and 93 together. The leaf spring section 91 for example is connected at 22' through the screw bolt with the site 22 of the underlying mounting plate and the leaf spring section 92 for example is connected at 21' with the site 21 of the underlying mounting plate 1. The leaf spring sections support themselves at the sites 12' on the respective underlying battens 12. Over the leaf spring set is arranged the additional spider. This is composed of the arms 5 and the mounting plates 2. The supporting sites are denoted with X. The supporting site 23" of the arm 5 lies however radially further outside, here under the mounting plate 1, at which site this spider is supported upon 23' of the leaf spring section 91. Now since the site 23', where the force acts on the leaf spring 91, does not lie on the straight line which connects the two connecting sites (22'), there occurs here when under load a twisting of the leaf spring section 91 rather than a deflection. The vibration damper of this invention does not necessarily have in every embodiment deflecting leaf springs, but as has here been shown, also torsion springs are possible.

Upon the spider with the arms 5 rests the additional leaf spring set, containing the leaf spring sections 91,92 and 93. The leaf spring section 91 for example is bolted at 24''' to the site 24" of the underlying mounting plate 2 and the leaf spring section 93 for example is bolted at 25''' to 25" of the mounting plate 2. The supporting sites of the leaf spring sections are indicated by 12''' and the underlying battens with 12" as previously noted, these screw bolts can be used to change the tension of the leaf springs. Topmost lies again the spider with the arms 6 and the mounting plate 3. The arm 6 is supported through the mounting plate 3 at the site 26"" on the site 26"' of the underlying leaf spring section 91.

Although in the interests of clearness there has been shown topmost a spider which is constructed like the underlying spiders, this is only an exemplified embodiment and that essentially only the three-point-contact of the topmost rigid element is necessary, which element may consist, as mentioned above, of a ball and cup.

Instead of the spider with three arms and corresponding leaf spring sections present in a triangle there are also other constructions possible depending on the field of application.

In FIG. 5 is illustrated for example a spider containing five arms 4 with the mounting plates 1. The superposed leaf spring sections 71, 72, 73, 74 and 75 describe an equilateral pentagon. The screw bolt connection sites are also here indicated by means of circles and the supporting sites on the leaf spring sections by means of X. The supporting sites of the leaf spring sections are denoted by 12' and the battens by 12.

In FIG. 6 is shown a four-armed spider with the arms 4 and mounting plates 1 and also a superposed leaf spring set in the form of leaf spring sections 71, 72, 73 and 74 describing a square. These leaf spring sections are screw connected at the sites denoted with circles to the underlying mounting plates 1, and the supporting sites on the leaf spring sections are again denoted by X. The supporting sites of the leaf spring sections are denoted by 12' and the battens by 12.

Figure 7:
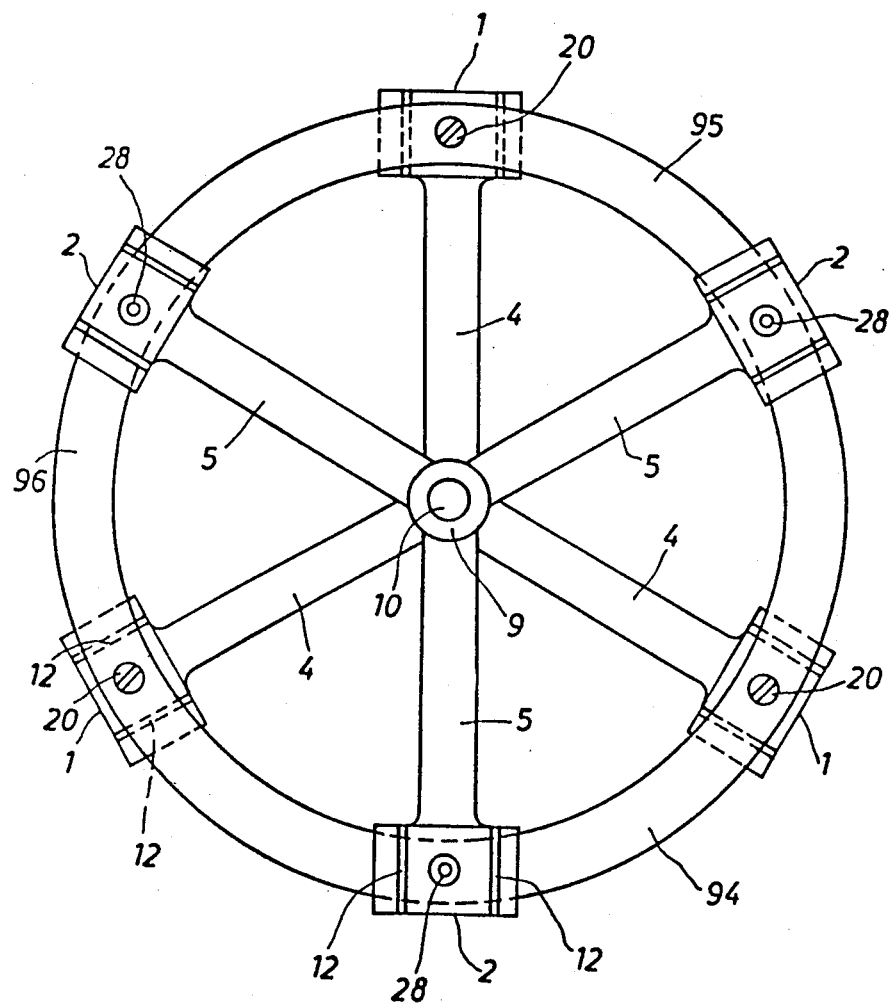
FIG. 7 is a plan view of a vibration damper whose leaf spring sections are designed in one piece with one another in the form of a circular ring.

In FIG. 7 is illustrated another embodiment with circular ring shaped leaf spring sections. The difference between this embodiment and the preceeding embodiments is that the leaf spring sections are connected in one piece, i.e. there exists an uninterrupted circular ring of spring steel. The lowermost spider (compare also with FIG.1) shows three arms 4 as well as the associated mounting plates 1. The mounting plates are equipped with parallel supporting battens 12. Moreover rod 10 and guide bushing 9 are likewise indicated in diagrammatic representation. Upon this lowest spider there rests now the circular ringshaped leaf spring which is composed of the sectors 94, 95 and 96. The reference number 20 denotes cap screws (here such as are being tightened with a screwdriver), by means of which is formed the connection with the leaf spring sectors 94, 95 and 96 with the underlying spider. As difference over the preceedings embodiments there exists here only one screw bolt 20 between every two supporting battens 12.

Upon the leaf spring circular ring there rests, to begin with, the next higher spider containing the arms 5 and the mounting plate 2. The mounting plates 2 again have the battens 12. The reference number 28 denotes the hole with the internal thread for taking up the screw bolt which connects the next superposed (undepicted) circular ring with the spider 5, 2.

Although this embodiment is presented with leaf spring sections conntected with one another in one piece in the form of a circular ring, there may in this case also exist a polygon according to the preceeding embodiments. It is clear that the superposed leaf spring sets in each case need not be exactly the same dimensions. In the punching out of the strip-shaped triangles which are closed upon themselves there could be punched out; in order to avoid needless waste, triangles of different lateral lengths so that there would result a pyramid-shaped vibration damper.

Other modifications will occur to those skilled in the art in the light of the present teaching.

1. A spring-equipped mechanical vibration damper comprising stacked, alternately-disposed, rigid spiders and leaf spring sets, each spider containing a central hub defining a central opening, a rod disposed in said openings supporting the spiders stacked in concentric relation to each other, said rod securing the spiders from rotation relative to each other, each spider comprising radially-disposed arms fixed at their proximal ends to the hub, mounting plates fixed to the distal ends of the arms, supports and connectors on the mounting plates, each leaf spring set comprising flat leaf spring sections disposed with their opposite ends resting on the supports at the ends of the arms and connected to said connectors thereon, said arms of the spiders having line contact with the subjacent leaf spring sections midway between the ends of the leaf spring sections and wherein the mounting plates of the lowermost spider are structured to rest upon a foundation.

2. Vibration damper according to claim 1, characterized in that the supports arranged upon the mounting plates are battens extending perpendicular to the center lines of the leaf spring sections resting thereon and that the connectors are screw bolts, screwed into the mounting plates and overhanging sections of the leaf spring sections.

3. Vibration damper according to claim 2, characterized in that the mounting plates intended to rest upon a respective foundation are equipped with a skid and absorber pad 4. Vibration damper according to claim 1, characterized in that each spider is disposed relative to a next lying spider at an angle that is one half of the angular distance of the spider arms.

5. Vibration damper according to claim 4, characterized in that the leaf spring sections of each respective leaf spring set are arcuate.

6. Vibration damper according to claim 5, characterized in that, the leaf spring sections are circular segments and that the spiders support themselves through the mounting plates on the respective thereunder-lying circular segmented leaf spring sections.

7. Vibration damper according to claim 5, characterized in the leaf spring sections are sections of an uninterrupted circular ring, which leaf spring sections are connected by their ends by means of a common connector arranged in the thereunder-lying mounting plate between the two battens on this mounting plate, and that the spiders are supported through the mounting plates on the respective underlying leaf spring sections of circular ring shape.

8. Vibration damper according to claim 1, characterized in the leaf spring sections of each leaf spring set are linearly running leaf spring strips which cross at a right angle under the respective rigid arm supported thereupon, and that the spiders are supported through their arms upon the leaf spring strips of a respective thereunder lying leaf spring section.

9. Vibration damper according to claim 8, characterized in that the leaf spring sections describe a polygon and that the spiders have a number of arms which number is equal to the number of the corners of the polygon.

* * * * *